(12) United States Patent
Winger

(10) Patent No.: US 7,813,429 B2
(45) Date of Patent: Oct. 12, 2010

(54) SYSTEM AND METHOD FOR SEGMENTATION OF MACROBLOCKS

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1348 days.

(21) Appl. No.: 11/293,404

(22) Filed: Dec. 2, 2005

(65) Prior Publication Data

US 2006/0083311 A1    Apr. 20, 2006

Related U.S. Application Data

(63) Continuation-in-part of application No. 10/217,142, filed on Aug. 13, 2002, now Pat. No. 7,020,200.

(51) Int. Cl.
*H04B 1/66* (2006.01)
*G06F 7/00* (2006.01)

(52) U.S. Cl. .................................. 375/240.16; 712/300

(58) Field of Classification Search ............ 375/240.16, 375/240.12, 240.24, 240.3, 240.1, 240.26, 375/240.25, 240.2; 348/441, 554, 598, 400.1, 348/540, 423.1, 467; 382/236, 246, 233, 382/309; 358/537, 538; 712/209, 200, 29.1, 712/208, 300

See application file for complete search history.

(56) References Cited

U.S. PATENT DOCUMENTS

| | | | |
|---|---|---|---|
| 4,982,285 A | 1/1991 | Sugiyama | 358/136 |
| 4,985,768 A | 1/1991 | Sugiyama | 358/136 |
| 5,113,255 A | 5/1992 | Nagata et al. | 358/136 |
| 5,132,792 A | 7/1992 | Yonemitsu et al. | 358/136 |
| 5,193,004 A | 3/1993 | Wang et al. | 358/136 |
| 5,247,363 A | 9/1993 | Sun et al. | 348/616 |
| 6,236,960 B1 * | 5/2001 | Peng et al. | 704/211 |
| 6,339,618 B1 | 1/2002 | Puri et al. | 375/240.16 |
| RE38,564 E | 8/2004 | Eifrig et al. | 382/236 |
| 2003/0099292 A1 | 5/2003 | Wang et al. | 375/240.12 |
| 2003/0099294 A1 | 5/2003 | Wang et al. | 375/240.15 |
| 2003/0202590 A1 | 10/2003 | Gu et al. | 375/240.13 |

* cited by examiner

*Primary Examiner*—Saeid Ebrahimi Dehkordy
(74) *Attorney, Agent, or Firm*—Christopher P. Maiorana, PC

(57) ABSTRACT

A method for processing a video stream is disclosed. The method generally includes the steps of (A) checking a respective first motion vector for each of a plurality of blocks in a group within an inter-coded picture of the video stream, (B) loading first motion compensation data for the group from a memory to a motion compensation process in a first bus transfer in response to all of the blocks in the group having both (i) a same first reference frame and (ii) a same first motion vector in at least one of a reference picture list 0 and a reference picture list 1 and (C) reconstructing the blocks from the first motion compensation data and the same first motion vector.

12 Claims, 6 Drawing Sheets

SYSTEM AND METHOD FOR SEGMENTATION OF MACROBLOCKS

CROSS REFERENCE TO RELATED APPLICATIONS

This application is a continuation-in-part of U.S. patent application Ser. No. 10/217,142, filed Aug. 13, 2002, now U.S. Pat. No. 7,020,200 which is hereby incorporated by reference in its entirety.

FIELD OF THE INVENTION

The present invention relates to video decoding generally and, more particularly, to a system and method for segmentation of macroblocks.

BACKGROUND OF THE INVENTION

Throughout the specification, a term MPEG is generally used as a generic reference to a family of international standards set by the Motion Picture Expert Group. MPEG reports to subcommittee 29 (SC29) of the Joint Technical Committee (JTC1) of the International Organization for Standardization (ISO) and the International Electrotechnical Commission (IEC).

Throughout the specification, a term H.26x is generally used as a generic reference to a closely related group of international recommendations by the Video Coding Experts Group (VCEG). VCEG addresses Question 6 (Q.6) of Study Group 16 (SG16) of the International Telecommunications Union Telecommunication Standardization Sector (ITU-T). The standards/recommendations specify exactly how to represent visual and audio information in a compressed digital format. The standards/recommendations are used in a wide variety of applications, including DVD (Digital Video Discs), DVB (Digital Video Broadcasting), digital cinema, and videoconferencing.

Throughout the specification, a term MPEG/H.26x will generally refers to the superset of MPEG and H.26x standards and recommendations. Several major MPEG/H.26x standards exist, such as H.261, MPEG-1, MPEG-2/H.262 and MPEG-4/H.263. Among the standards, MPEG-2/H.262 is commercially significant, being sufficient in many applications for all the major television standards, including NTSC (National Standards Television Committee) and HDTV (High Definition Television). Of the series of MPEG standards that describe and define the syntax for video broadcasting, the standard of relevance to the present invention includes the standard ITU-T Recommendation H.264, ISO/IEC 14496-10 AVC, which is hereinafter referred to as "MPEG-AVC/H.264".

A feature of MPEG/H.26x is that the standards are often capable of representing a video signal with data roughly $\frac{1}{50}$th a size of the original uncompressed video, while still maintaining good visual quality. Although the compression ratio varies greatly depending on the nature of the detail and motion of the source video, the example compression ratio serves to illustrate that compressing digital images is an area of interest to those who provide digital transmission.

MPEG/H.26x achieves high compression of a video signal through the successive application of four basic mechanisms:
1) Storing the luminance (e.g., black and white) detail of the video signal with more horizontal and vertical resolution than the two chrominance (e.g., color) components of the video.
2) Storing only the changes from one video frame to another, instead of the entire frame. Stored motion vector symbols indicate spatial correspondence between frames.
3) Storing the changes with reduced fidelity, as quantized transform coefficient symbols, to trade off a reduced number of bits per symbol with increased video distortion.
4) Storing all the symbols representing the compressed video with entropy encoding, to reduce the number of bits per symbol without introducing any additional video signal distortion.

SUMMARY OF THE INVENTION

The present invention concerns a method for processing a video stream. The method generally comprises the steps of (A) checking a respective first motion vector for each of a plurality of blocks in a group within an inter-coded picture of the video stream, (B) loading first motion compensation data for the group from a memory to a motion compensation process in a first bus transfer in response to all of the blocks in the group having both (i) a same first reference frame and (ii) a same first motion vector in at least one of a reference picture list 0 and a reference picture list 1 and (C) reconstructing the blocks from the first motion compensation data and the same first motion vector.

The objects, features and advantages of the present invention include providing a system and method for segmentation of macroblocks that may (i) save bus bandwidth and/or (ii) reduce system costs compared with conventional techniques.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
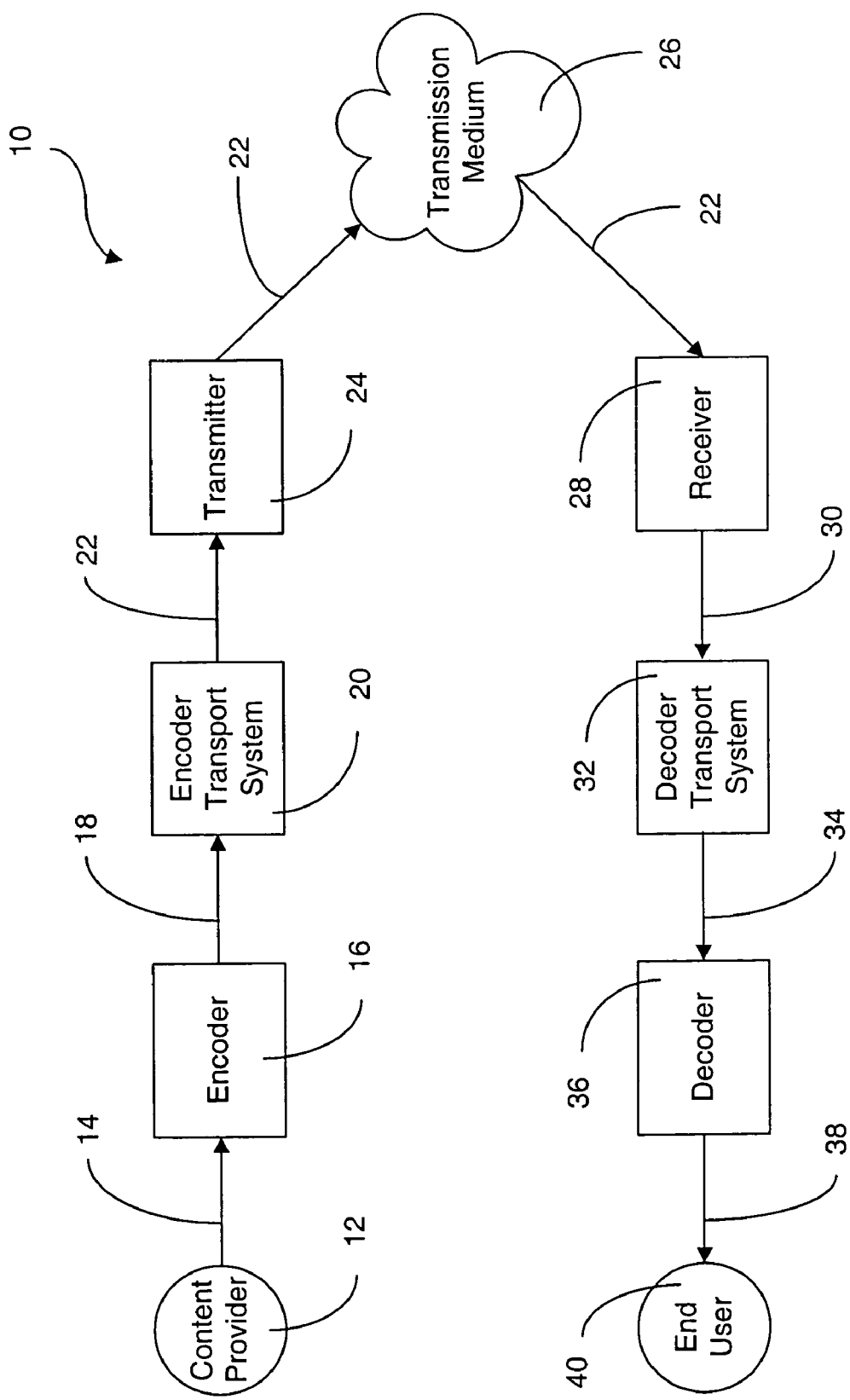
FIG. 1 is a block diagram of a video transmission and receiving system.

Referring to FIG. 1, a video transmission and receiving system is shown generally as 10. A content provider 12 may provide a video source 14 to an encoder 16. A content provider may be anyone of a number of sources, but for the purpose of simplicity, the video source 14 may be viewed as originating from a television transmission, either analog or digital. The encoder 16 generally receives the video source 14 and utilizes a number of compression techniques to reduce a size of the video source 14 and passes an encoded stream 18 to encoder transport system 20. The encoder transport system 20 may receive and restructure the encoded stream 18 into a transport stream 22 acceptable to a transmitter 24. The transmitter 24 may then distribute transport stream 22 through a transport medium 26, such as the Internet or any form of a network enabled for the transmission of MPEG data streams. A receiver 28 generally receives transport stream 22 that may be passed along as received stream 30 to a decoder transport system 32. In a perfect world, the steam 22 and the stream 30 would be the same. The decoder transport system 32 generally processes the stream 30 to create a decoded stream 34. Again, in a perfect world, the encoded stream 18 and the encoded stream 34 would be the same. The decoder 36 may then reverse the steps applied by the encoder 16 to create an output stream 38 that may be delivered to a user 40.

Figure 2:
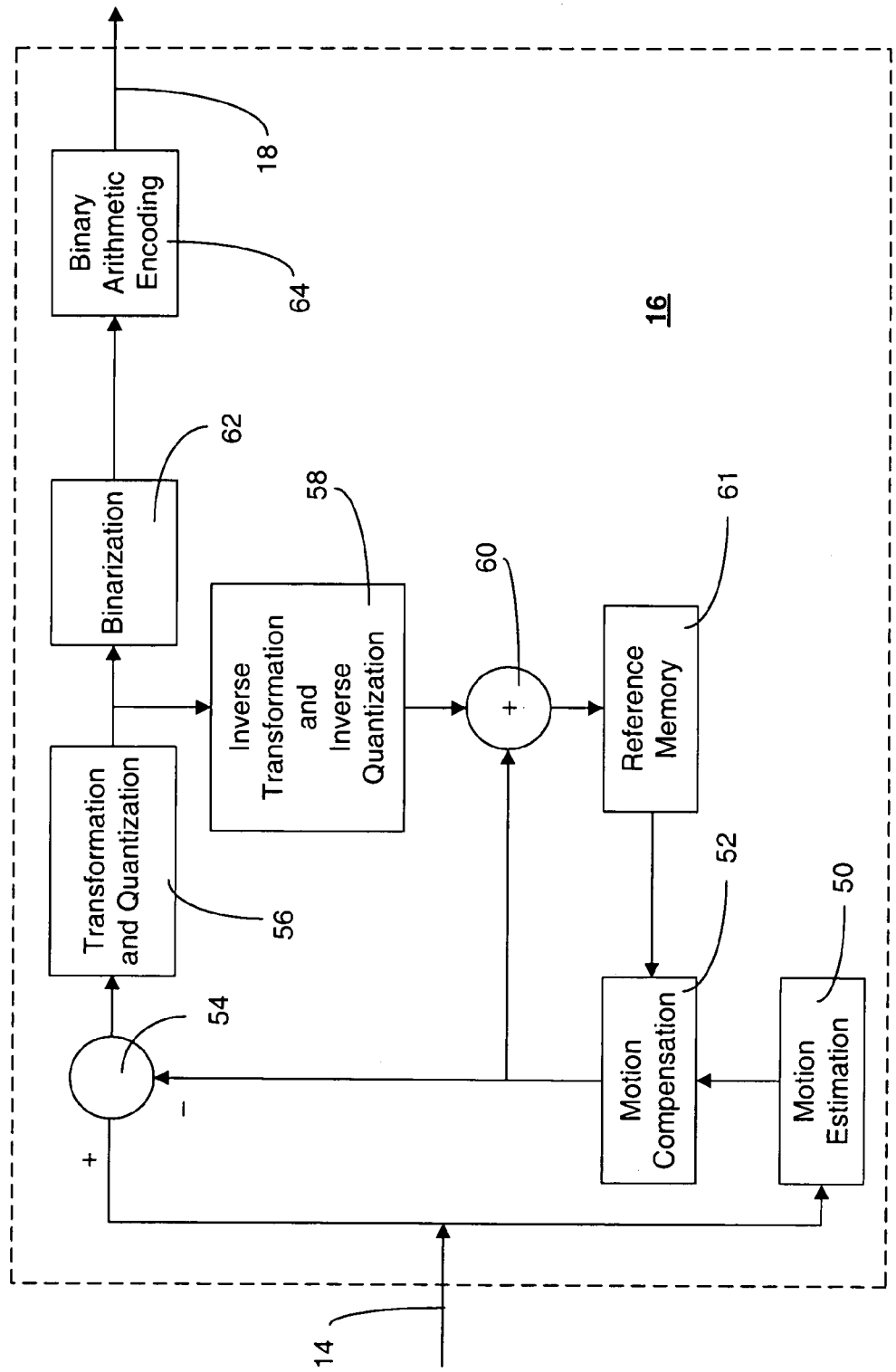
FIG. 2 is a block diagram of an encoder.

Referring to FIG. 2, a block diagram of an encoder is shown generally as 16. The encoder 16 may accept the video source 14 as an input signal. The video source 14 may be passed to a motion estimation module 50, which determines motion difference between frames. An output of motion estimation module 50 may be passed to motion compensation module 52. At a combination module 54, an output signal from the motion compensation module 52 is generally subtracted from the input video source 14 to create an input signal to a transformation and quantization module 56. An output signal from motion the compensation module 52 may also be provided to an adder module 60. The module 56 generally transforms and quantizes an output signal from the combination module 54. An output signal from the module 56 may have to be recalculated based upon prediction error, thus a loop comprising modules 52, 54, 56, 58, 60 and 61. The output signal from the module 56 may become an input signal to an inverse transformation module 58. The inverse transform module 58 generally applies an inverse transformation and an inverse quantization to the signal received from the module 56 and provides a resulting signal to an adder module 60. The adder module 60 may combine the inverse quantized signal with the output signal from the motion compensation module 52 to create a reconstructed signal. Reconstructed pictures in the reconstructed signal may be stored in a reference memory 61. The reconstructed pictures may then be used as reference pictures by the motion compensation module 52.

With regard to the above description of FIG. 2, those skilled in the art will appreciate that the functionality of the modules illustrated are well defined in the MPEG family of standards. Further, numerous variations of modules of FIG. 2 have been published and are readily available.

An MPEG video transmission is essentially a series of pictures taken at closely spaced time intervals. In the MPEG/H.26x standards, a picture may be referred to as a "frame" or a "field" (hereafter, generically referred to as frames). For example, each picture in a video sequence may be encoded as one of two types, (i) an intra frame or (ii) an inter frame. Intra frames (e.g., I-frames) may be encoded in isolation from other frames, compressing data based on similarity within a region of a single frame. Inter frames (e.g., P-frames and B-frames) may be coded based on similarity a region of one frame and a region of a successive frames. Fields may be treated in a similar manner.

In a simplest form, an inter frame may be thought of as encoding the difference between two successive frames. Consider two frames of a video sequence showing waves washing up on a beach. The areas of the video that show the sky and the sand on the beach generally do not change, while the area of video where the waves move does change. An inter frame in the sequence may contain only the difference between two frames. As a result, only pixel information relating to the waves may be repeatedly encoded, not pixel information relating to the sky or the beach.

An inter frame may be encoded by generating a predicted value for each pixel in the frame based on pixels in previously encoded frames. The aggregation of the predicted values is usually called a predicted frame. The difference between the original frame and the predicted frame may be called a residual frame. The encoded inter frame generally contain information about how to generate the predicted frame utilizing both the previous frames and the residual frame. In the example of waves washing up on a beach, the predicted frame may be the first frame of the two frames and the residual frame may be the difference between the two frames.

In the MPEG-AVC/H.264 standard, two types of inter frames may be defined. Predictive frames (e.g., P-frames) may be encoded based on a predictive frame created from one or more frames that occur earlier in the video sequence. Bidirectional predictive frames (e.g., B-frames) are generally based on predictive frames that are generated from two frames either earlier or later in the video sequence.

Figure 3:
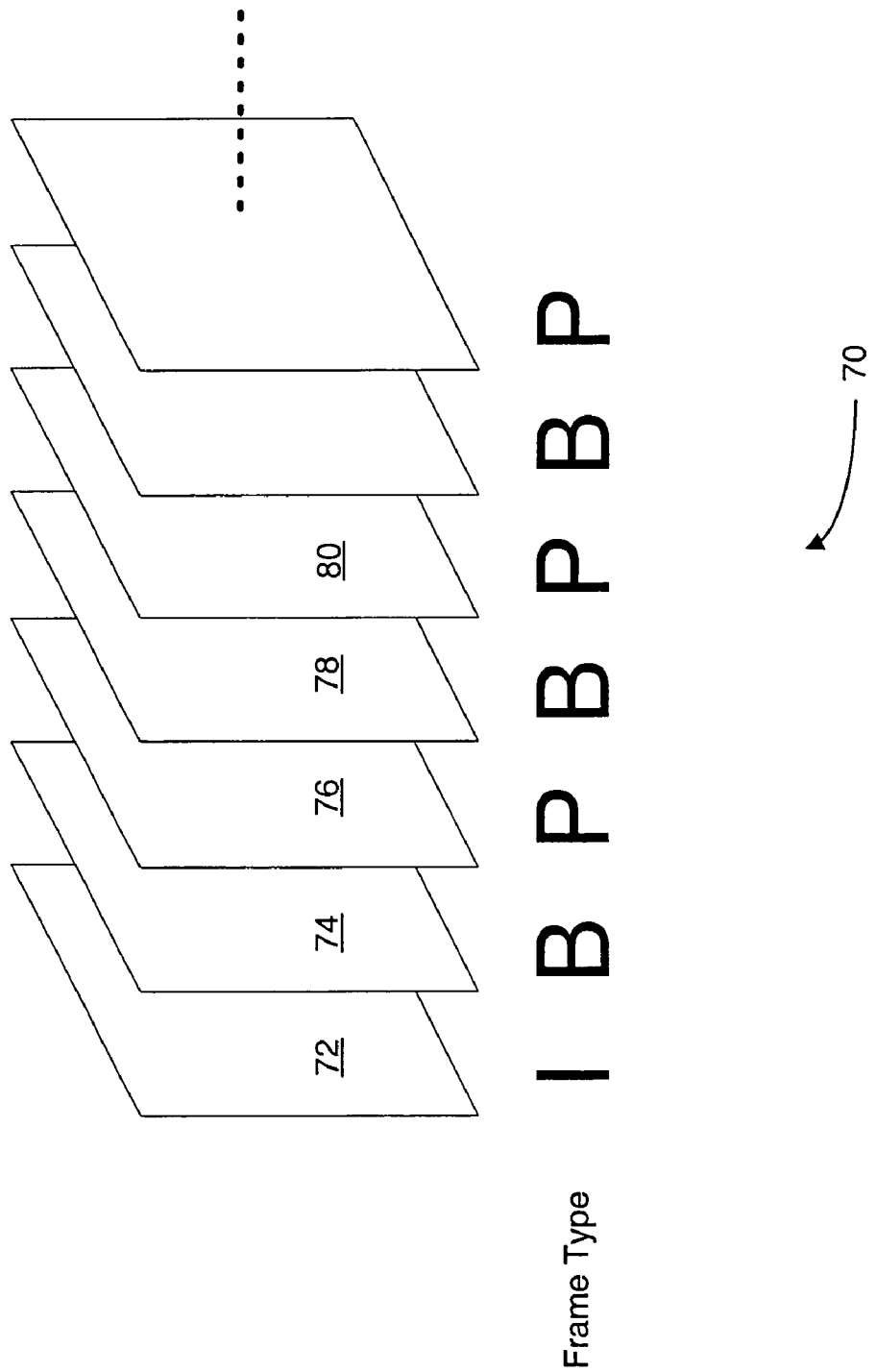
FIG. 3 is a schematic diagram of a sequence of video frames.

Referring to FIG. 3, a typical frame type ordering of a video sequence is shown generally as 70. P-frames may be predicted from earlier P-frames or I-frames. In FIG. 3, a third frame 76 (e.g., P-frame) may be predicted from a first frame 72 (e.g., I-frame). A fifth frame 80 may be predicted from a frame 76 and/or the frame 72. B-frames may be predicted from earlier and later I-frames or P-frames. For example, frame 74 being a B frame, may be predicted from the I-frame 72 and the P-frame 76.

A frame may be spatially subdivided into two interlaced "fields". In an interlaced video transmission, a "top field" generally comes from the even lines of the frame. A "bottom field" generally comes from the odd lines of the frame. For video captured in interlaced format, the fields, not the frames, may be regularly spaced in time. Two consecutive fields may be temporally sequential. A typical interval between successive fields is 1/60th of a second, with each of the top fields temporally prior to the respective bottom fields.

Either the entire frame, or the individual fields are generally divided completely into rectangular sub-partitions known as blocks, with associated motion vectors. Often a picture may be quite similar to a preceding picture or a following picture. For example, the video of the waves washing up on the beach would change little from picture to picture. Except for the motion of the waves, the beach and sky would be largely the same over time. Once the scene changes, however, some or all similarity may be lost. The concept of compressing the data in each picture generally relies upon a fact that (i) many images often do not change significantly from picture to picture and (ii) the changes that do occur may often be simple, such as image pans or horizontal and vertical block translations. Thus, transmitting only block translations (also known as the motion vectors) and differences between blocks, as opposed to the entire picture, generally results in considerable savings in data transmission/storage. The process of reconstructing a block by using data from a block in a different frame or field may be referred to as motion compensation.

Usually motion vectors are predicted, such that the motion vectors may be represented as a difference from a predictor, known as a predicted motion vector residual. In practice, the pixel differences between blocks may be transformed into frequency coefficients and then quantized to reduce the data transmission further. The quantization generally allows the frequency coefficients to be represented using only a discrete number of levels. The quantization is usually the mechanism by which the compressed video becomes a "lossy" representation of the original video. The process of transformation and quantization may be performed by an encoder.

In recent MPEG/H.26x standards, such as MPEG-AVC/H.264 and MPEG-4/H.263, various block-sizes may be supported for motion compensation. Smaller block-sizes imply that higher compression may be obtained at the expense of increased computing resources for typical encoders and decoders. Usually motion vectors are either (a) spatially predicted from previously processed, spatially adjacent blocks or (b) temporally predicted from spatially co-located blocks in the form of previously processed fields or frames.

Actual motion may then be optionally represented as a difference from the predictor, known as a predicted motion vector residual. Recent MPEG/H.26x standards, such as the MPEG-AVC/H.264 standard, include block modes that may identify the type of prediction used for each predicted block. Two types of block modes generally exist, namely:

1) Spatial prediction modes may be identified as intra modes utilizing intra-frame/field prediction. Intra-frame/field prediction is generally prediction only between picture elements within the same field or frame.
2) Temporal prediction modes may be identified as inter modes. Temporal prediction modes generally use motion vectors and thus utilize inter-frame/field prediction. Inter-frame/field prediction is generally prediction between frames/fields at different temporal positions.

Currently, the only type of inter mode that uses temporal prediction of the motion vectors may be the "direct" mode of MPEG-AVC/H.264 and MPEG-4/H.263. In the direct mode, the motion vector of a current block may be taken directly from a co-located block in a temporally subsequent frame/field. The co-located block may have the same vertical and horizontal coordinates of the current block, but resides in the subsequent frame/field. As such, the co-located block generally has the same spatial location as the current block. No predicted motion vector residual may be coded for direct mode. Rather, the predicted motion vector may be used without modification. Because the motion vector comes from a temporally subsequent frame/field, the temporally subsequent frame/field should be processed prior to the current frame/field. Thus, processing of the video from a compressed representation may be done temporally out of order. In the case of P-frames and B-frames (see the description of FIG. 3), B-frames may be encoded after temporally subsequent P-frames. The B-frames may take advantage of simultaneous prediction from both temporally subsequent and temporally previous frames. With the above structure, the direct mode may be defined only for B-frames, since previously processed, temporally subsequent reference P-frames may only be available for B-frames.

As previously noted, small block sizes typically result in increased computing resources. A process by which direct-mode blocks in a B-frame may derive motion vectors from blocks of a P-frame is generally defined herein. Derived motion vectors may be achieved by combining the smaller motion compensated P-frame blocks to produce larger motion compensated blocks in a direct-mode B-frame block. Thus, system memory bandwidth used for motion compensation for a broad range of commercial system architectures may be reduced. Since the memory subsystem is a significant factor in video encoder and decoder system cost, a direct-mode defined to permit the most effective compression of typical video sequences, while increasing motion compensation block size may significantly reduce a system cost.

Although B-frames typically reference P-frames to derive motion vectors, utilizing B-frames to derive motion vectors is also possible. The motion vectors may be derived through temporal prediction between different video frames. The derivation may be achieved by combining the motion vectors of small blocks to determine motion vectors for larger blocks. As such, a lower-cost system solution than conventional solutions, such as that proposed in the joint model (JM) 1.9, of MPEG-AVC/H.264 in which blocks were not combined for the temporal prediction of motion vectors, may be achieved. A portion of a pseudo code for the above solution may be as follows:

```
void Get_Direct_Motion_Vectors ( )
{
int block_x, block_y, pic_block_x, pic_block_y;
int refframe, refP_tr, TRb, TRp, TRd;
for (block_y=0; block_y<4; block_y++)
{
    pic_block_y = (img->pix_y>>2) + block_y; ///*** old method
    for (block_x=0; block_x<4; block_x++)
    {
        pic_block_x = (img->pix_x>>2) + block_x; ///*** old method
...
```

In the above code sample, the values of img->pix_y and img->pix_x generally indicate a spatial location of the current macroblock in units of pixels. The values of block_y and block_x generally indicate a relative offset within the current macroblock of the spatial location of each of the 16 individual 4×4 blocks within the current macroblock, in units of four pixels. The values of pic_block_y and pic_block_x generally indicate the spatial location of the co-located block from which the motion vectors of the current block may be derived, in units of four pixels. The operator ">>2" may divide by four thereby making the equations calculating the values of pic_block_y and pic_block_x use units of four pixels throughout.

The variables pic_block_y and pic_block_x generally index into the motion vector arrays of the co-located temporally subsequent macroblock to get the motion vectors for the current macroblock. In the code, the variables pic_block_y and pic_block_x take values between 0 and 3 corresponding to the four rows and four columns of FIG. 4.

Figure 4:
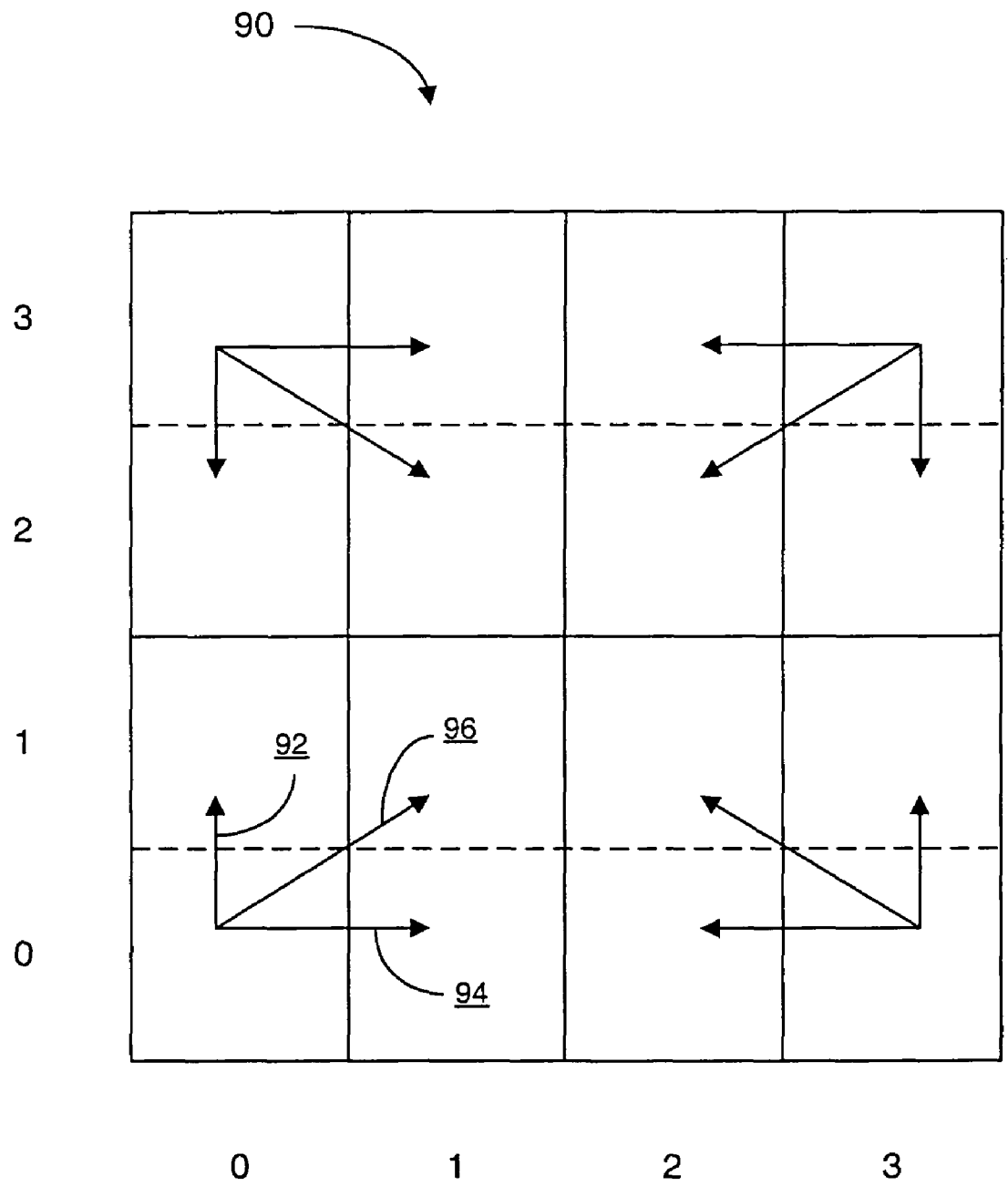
FIG. 4 is a block diagram of direct-mode inheritance of motion vectors from co-located blocks.

Referring to FIG. 4, a block diagram of direct-mode inheritance of motion vectors from co-located blocks is shown generally as 90. The variables pic_block_x and pic_block_y may take only values 0 and 3, corresponding to the four corners shown in FIG. 4. Therefore, at most four different motion vectors may be taken from the co-located macroblock by a motion vector operation (e.g., ReconMV module 110 in FIG. 5). In contrast, conventional methods may be taken from up to thirty-two different motion vectors. The motion vector of block (0,0) may thus be duplicated in blocks (0,1), (1,0) and (1,1) as indicated by arrows 92, 94 and 96, respectively, by the motion vector operation (e.g., ReconMV module 110 in FIG. 5). As a result, the motion vectors for each corner block in a co-located macroblock may become the motion vectors for a larger block in the current macroblock. In the case illustrated, four larger blocks may be formed from a 2×2 array of 4×4 pixel blocks.

Pseudo-code for an aggregation of blocks is generally illustrated as follows:

```
void Get_Direct_Motion_Vectors ( )
{
int block_x, block_y, pic_block_x, pic_block_y;
int refframe, refP_tr, TRb, TRp, TRd;
for (block_y=0; block_y<4; block_y++)
{
    pic_block_y = (img->pix_y>>2) + ((block_y>=2)?3:0);
    for (block_x=0; block_x<4; block_x++)
    {
        pic_block_x = (img->pix_x>>2) + ((block_x>=2)?3:0);
...
```

In the code for the above example, the spatial location of the co-located block (pic_block_x, pick_block_y) may be the same as the spatial location of the current block. For example, the spatial location may be:

$$((\text{img->pix\_}x>>2)+\text{block\_}x,(\text{imp->pix\_}y>>2)+\text{block\_}y)$$

In the example code, the spatial location of a co-located block may be derived from the spatial location of the current block by forcing a co-located block to be one of the four corner blocks in the co-located macroblock, from the possible 16 blocks. The derivation may be achieved by the following equations:

$$\text{pick\_block\_}x=(\text{img->pix\_}x>>2)+((\text{block\_}x>=2)?3:0) \quad \text{Eq.(1)}$$

$$\text{pick\_block\_}y=(\text{img->pix\_}y>>2)+((\text{block\_}y>=2)?3:0) \quad \text{Eq.(2)}$$

Since each co-located macroblock may in general have motion vectors associated with two different reference frames, the method may also reduce a maximum number of motion vectors from 32 to 8. By way of illustration, TABLE I may contain a mappings of blocks within a current macroblock to positions in a co-located macroblock. TABLE I generally shows the block offsets within a macroblock in units of four pixels, rather than absolute offsets within the current frame for all blocks in the frame. In TABLE I, the first column generally contains the location of a current block, as determined by:

$$((\text{img->pix\_}x>>2)+\text{block\_}x),(\text{img->pix\_}y>>2)+\text{block\_}y);$$

The second column generally contains the location of the co-located block, as determined by:

$$(\text{pic\_block\_}x,\text{pic\_block\_}y).$$

TABLE I

Mapping from co-located blocks to current blocks

| Current Block | Co-located Block |
|---|---|
| (0, 0) | (0, 0) |
| (0, 1) | (0, 0) |
| (0, 2) | (0, 3) |
| (0, 3) | (0, 3) |
| (1, 0) | (0, 0) |
| (1, 1) | (0, 0) |
| (1, 2) | (0, 3) |
| (1, 3) | (0, 3) |
| (2, 0) | (3, 0) |
| (2, 1) | (3, 0) |
| (2, 2) | (3, 3) |
| (2, 3) | (3, 3) |
| (3, 0) | (3, 0) |
| (3, 1) | (3, 0) |
| (3, 2) | (3, 3) |
| (3, 3) | (3, 3) |

While references may be made to blocks of 4×4 pixels and macroblocks of 4×4 blocks, other block sizes may be implemented to meet the criteria of a particular application. Any size of blocks within any size of macroblock may be used, which provides a means for reducing the number of motion vectors in the direct mode for bi-predictive fields and frames.

A macroblock reconstruction rule (e.g., a direct_8×8_inference_flag macroblock reconstruction rule per the H.264 standard) may be implemented in an H.264-compliant decoder and/or in a decoding loop of an encoder, a transcoder and/or the like. Motion vector storage, especially for neighborhood and co-located frames, may be greatly reduced by exploiting a motion vector structure mandated for High Definition Television (HDTV) profiles of the H.264 standard decoder. In particular, for all Main Profiles and High Profiles (e.g., the broadcast TV profiles) of level 3.1 and above (e.g., all HDTV resolutions), the direct_8×8_inference_flag motion vector decoding rule is mandated for H.264 decoding. Therefore, all of the following savings may be realized in a decoder:

1) Greatly reduced bus-bandwidth for motion compensation at high definition resolutions.
2) Reduced storage for adjacent and co-located motion vectors.
3) Reduced bus-bandwidth for motion vectors.

The above advantages generally result in reduced decoder cost, as (i) both silicon area and specified speed may be reduced, (ii) memory (e.g., SDRAM) bus speeds and bus widths may be reduced and/or (iii) SDRAM size may be reduced somewhat. Additional bus-bandwidth savings may be had by making use of the direct_8×8_inference_flag decoding rule. The savings due to the method may be both immediate and indirect (as will be described herein) if implemented correctly in a decoder.

When an inter predicted macroblock is partitioned into sub-blocks, motion compensation (e.g., ReconMB module 116 in FIG. 5) for the inter predicted macroblock may first check the motion vector values for both list 0 and list 1 predictions before loading the motion compensated blocks. The following rules may be applied based on the results of the check. Rule 1: If the same reference frame and the same motion vector is used in either list for an entire 16×16 macroblock, then a mode for motion compensation purposes may be set to 16×16 for that load (e.g., only a single motion compensated data load, a single DMA transfer, may be implemented to load the 16×16 block of motion compensation pixels). Rule 2: Else, if the motion vectors (MVs) and reference frames (RFs) are the same for both 16×8 blocks (of the 16×16 macroblock), the 16×8 pixel block size may be used. Rule 3: Else, if the MVs and RFs are all the same for both 8×16 blocks, the 8×16 pixel block size may be used. (In some embodiments, the 8×16 block size may be checked before the 16×8 size.) Rule 4: Else, if the MVs and RFs are all the same for all 8×8 blocks of the macroblock, then the 8×8 pixel block size may be used.

For high-definition video, the H.264 Main Profile and High Profile generally mandate a specific block size (e.g., MinLumaBiPredSize) be set to 8×8 and a direct inference flag (e.g., direct_8×8_inference_flag) be set to one. In bi-predicted frames, no inter block smaller than 8×8 may be permitted. As such, a last of the above four rules may be redundant for temporal direct mode macroblocks in which the direct_8×8_inference_flag motion vector decoding rule is used for the profiles.

When the direct_8×8_inference_flag is on (set or asserted), the above motion compensation block aggregation rules may be more effective (e.g., much more likely to be invoked) than when the direct_8×8_inference_flag is off (reset or deasserted). The increased likeliness is because a chance of a small number of medium-sized blocks (e.g., 8×8 blocks) being aggregated together into a large block (e.g., 16×16 block) for motion compensation is generally much better than the chance of a larger number of small blocks (e.g., 4×4 blocks) being aggregated together into the large block (e.g., 16×16 block) for the purpose of motion compensation.

In practice, bus-bandwidth savings may be achieved when the above "segmentation rules" are used in an H.264 decoder.

In some embodiments, the segmentation may be utilized whenever loading the data from a reference memory to a motion compensation process. As such, pixels that reference the same reference frame with the same motion vector may be grouped together regardless of the weighting applied to the blocks. For example, if the H.264 reference index changes, the present invention may still combine blocks for the purpose of motion compensated reference pixel data loading/DMA transfers, even if the data is later to be weighted differently in a macroblock reconstruction process.

In other embodiments, the segmentation process may check for alternative groupings of blocks that may all be loaded from the reference memory simultaneously. The alternative groupings of blocks may include, but are not limited to, non-adjacent blocks for a single contiguous DMA load. Generally, the segmentation motion compensated loading strongly complements the 8×8 motion vector inference rule, since the later may make the former much more effective as a tool for reducing memory subsystem costs by reducing average bus bandwidth.

Figure 5:
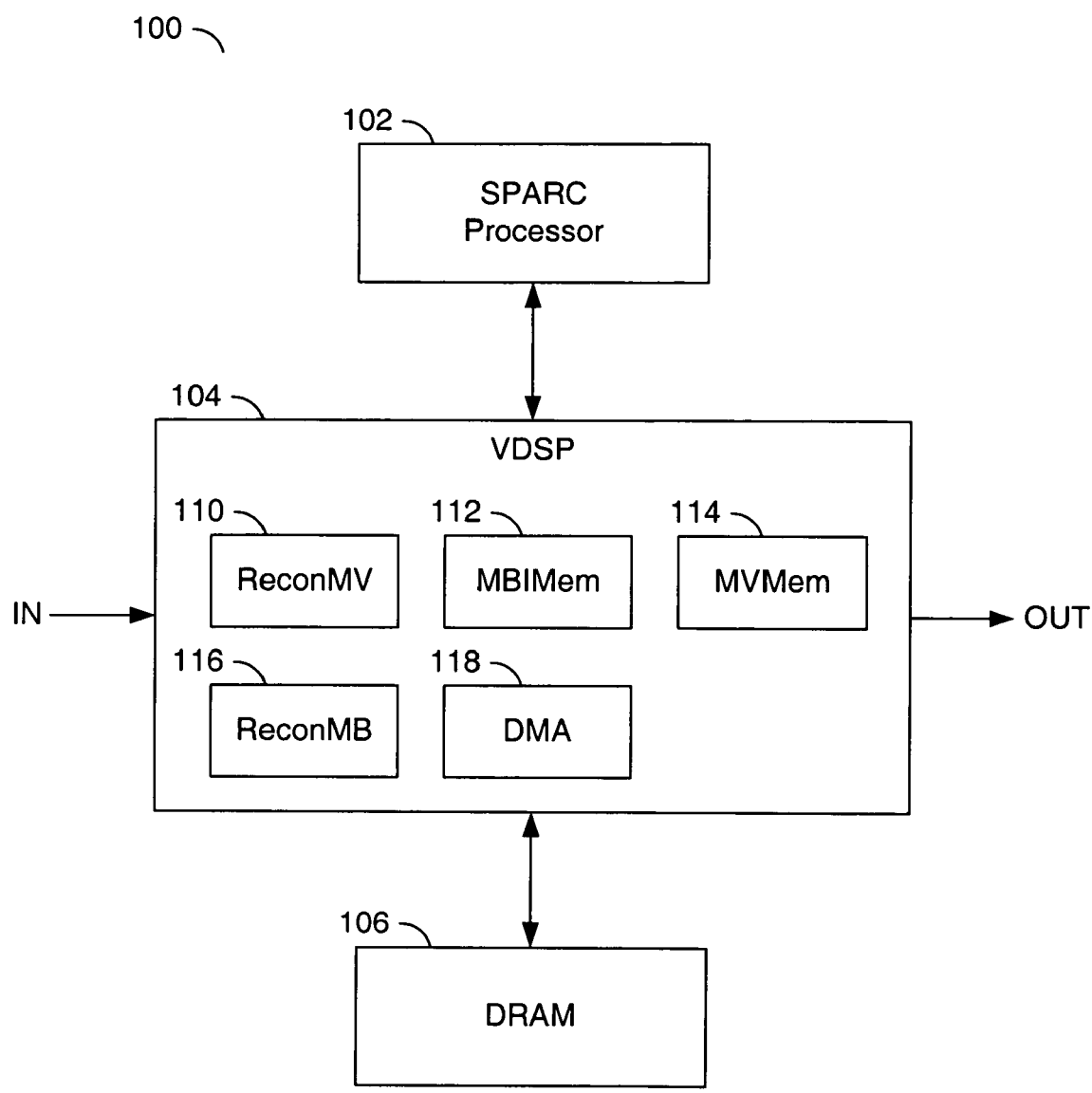
FIG. 5 is a block diagram of an example implementation of a system in accordance with a preferred embodiment of the present invention.

Referring to FIG. 5, a block diagram of an example implementation of a system 100 is shown in accordance with a preferred embodiment of the present invention. The system (or apparatus) 100 generally comprises a first processor module 102, a second processor module 104 and a memory module 106. An input signal (e.g., IN) may be received by the second processor module 104. An output signal (e.g., OUT) may be generated and presented by the second processor module 104.

The system 100 may form a portion of an encoder system or a decoder system. Where the system 100 is part of an encoder, the input signal IN may comprise an uncompressed digital video stream and the output signal OUT may comprise a compressed video stream. Where the system 100 is part of a decoder, the input signal IN may comprise a compressed video stream and the signal OUT may comprise an uncompressed digital video stream.

The first processor 102 may be implemented as a SPARC processor. The second processor 104 may be implemented as a video digital signal processor (VDSP). The memory module 106 may be implemented as a double data rate (DDR) dynamic random access memory (DRAM). Other types of processors and memories may be implemented to meet the criteria of a particular application.

The VDSP 104 generally comprises a number of functional blocks (or modules). The functional blocks may include, but are not limited to, a motion vector reconstruction module (ReconMV) 110, a macroblock information memory module (MBIMem) 112, a motion vector memory module (MVMem) 114, a macroblock reconstruction module (RconMB) 116 and a direct memory access module (DMA) 118.

Figure 6:
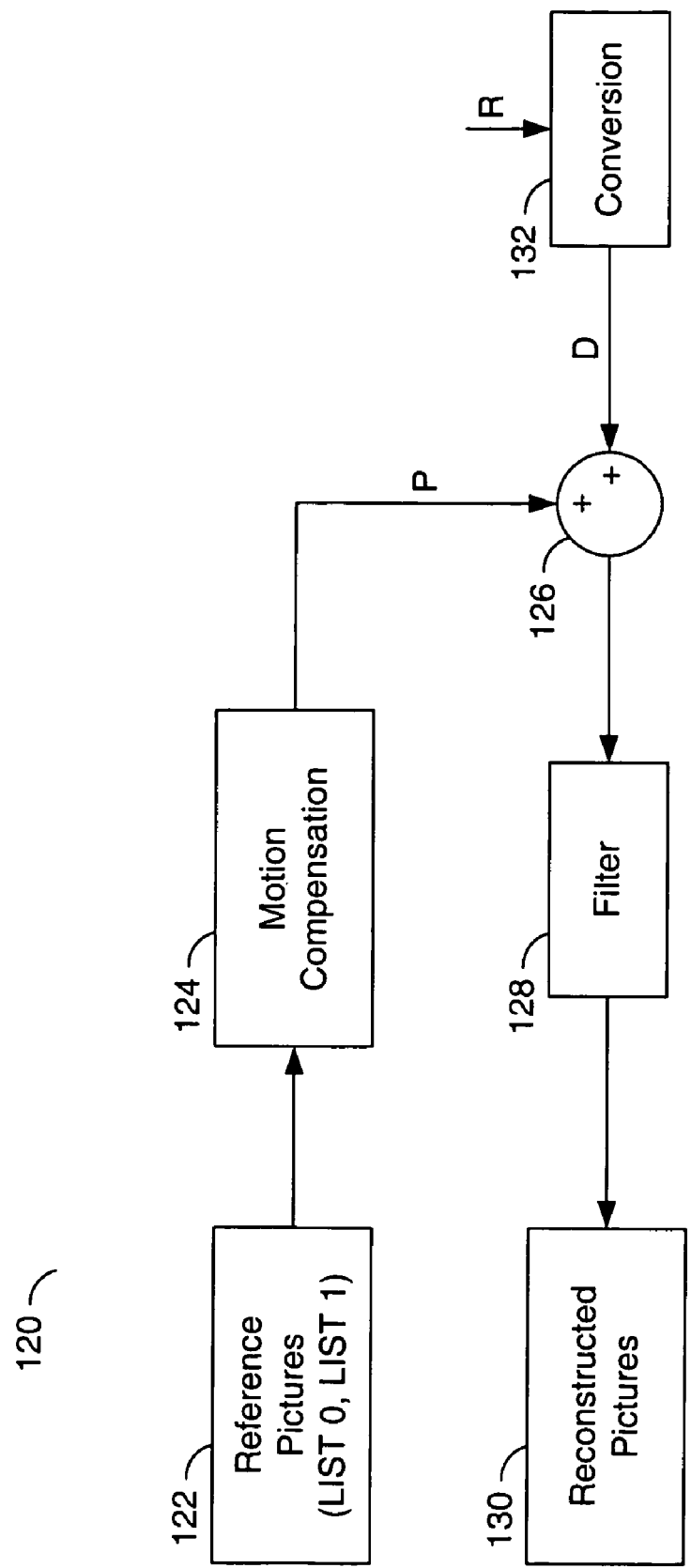
FIG. 6 is a functional block diagram for part of a process of a video digital signal processor and a memory module.

Referring to FIG. 6, a functional block diagram for part of a process 120 of the VDSP 104 and the memory module 106 is shown. The process (or method) 120 generally comprises a reference picture read function 122, a motion compensation function 124, an adder function 126, an optional filter function 128, a reconstructed picture store function 130 and a conversion function 132. An input signal (e.g., D) may carry residual (or difference) macroblocks that have already been converted by the conversion 132 (e.g., at least inverse quantized and inverse discrete cosine transformed). An optional received signal (e.g., R) may carry an encoded bitstream.

The process 120 may be used in a decoder to reconstruct the coded pictures received in the signal R. The process 120 may also be used in a feedback loop in an encoder to reconstruct the coded pictures generated elsewhere within the encoder. The reference picture read function 122 and the reconstructed picture store function 130 may be implemented in the memory module 106. The motion compensation function 124, the adder function 126, the filter function 128 and the conversion function 132 may be implemented in the VDSP 104.

Referring to FIGS. 5 and 6, the received signal R may be processed by the conversion function 132 to generate the encoded stream D. In a decoder implementation, the conversion function 132 generally comprises an entropy decode function, a reorder function, an inverse quantization function and an inverse discrete cosine transform function. In an encoder implementation, the conversion function 132 may be implemented in the inverse transformation module 58 (FIG. 2) generally comprising the inverse quantization function and the inverse discrete cosine transform function.

When a macroblock uses the direct mode or is in a partition mode, the ReconMV module 110 may compute the segmentation of the macroblock. If (i) a list zero (L0) prediction flag and a list one (L1) prediction flag, (ii) a L0 (used) field identification and an L1 field identification and (iii) a L0 (used) motion vector and an L1 motion vector are constant in the whole macroblock, the 16×16 segmentation may be used. Else, if the prediction flags, field identifications and motion vectors are constant in each 8 H×16 V region, an 8 H×16 V segmentation may be used. Else, if the prediction flags, field identifications and motion vectors are constant in each 16 H×8 V region, a 16 H×8 V segmentation may be used. Else, an 8 H×8 V segmentation may be used. The segmentation approach may be used for loading data, so the checking may be for (i) same field identifications and (ii) top or bottom field prediction. Alternatively, the segmentation approach may be used for simultaneous loading and weighting of data, in which case the checking may either be for matching reference indices, or for (i) same field identifications, (ii) top or bottom field prediction and (iii) same weighting factors.

Motion vectors may be stored in the MBIMem module 112 in an order that would appear in a bit stream for a given segmentation. Thus, for an segmentation of 16×16 the order may be:
1) If(predflagL0), then L0 16×16,
2) If(predflagL1), then L1 16×16,
For the 8 H×16 V segmentation, the order may be:
1) If(predflagL0 for top), then L0 8 H×16 V for a top field.
2) If(predflagL1 for top), then L1 8 H×16 V for the top field.
3) If(predflagL0 for bottom), then L0 8 H×16 V for a bottom field.
4) If(predflagL1 for bottom), then L1 8 H×16 V for the bottom field, and so on. For a case where the direct mode is set and a direct inference parameter (e.g., direct_inference_8×8) is set, the vectors returned may be partition 0 L0 L1, . . . partition 3 L0 L1, unless a different segmentation is used. For a case where the parameter direct_inference_8×8 is clear, the vectors returned may be blocks 0-3 L0, blocks 0-3 L1, . . . blocks 12-15 L0, and blocks 12-15 L1.

For each set of motion vectors that covers an 8×8 region, or for a single motion vector that covers an area larger than 8×8, two bytes of DMA information stored in the MBIMem module 112 may be set to the correct values. L1 is generally set based on a macroblock type or sub-macroblock type (for median prediction). L1 may alternate for direct mode. Furthermore, L1 may always be cleared for P-slices. A DMA register set may be disposed in the MVMem module 114 and indexed with the frame identification. A variable (e.g., TOP (top field, not bottom field) flag) may be a logical inverse of a least significant bit of the field identification. Variables (e.g., Part Num and MBlkConfig) may be set based on the effective block size and motion vector number.

Once the segmentation of two or more blocks has been determined, the DMA module 118 may initiate a single direct-memory-access transfer to copy a reference picture from the reference picture read 122 to the motion compensation 124. The motion compensation function 124 (e.g., ReconMB module 116) may generate prediction blocks in a signal (e.g., P) based on the reference picture and the motion vector of the segmentation block. The prediction blocks in the signal P and the residual blocks in the signal D may be added by the adder 126 to generate reconstructed blocks. The filter 128 may optionally block filter the reconstructed blocks. Thereafter, the filtered reconstructed blocks may be transferred back to the memory module 106 for storage 130.

The function performed by the functional block diagram of FIG. 6 may be implemented using a conventional general purpose digital computer programmed and/or a video digital signal processor according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for processing a video stream, comprising the steps of: (A) checking a respective first motion vector for each of a plurality of blocks in a group within an inter-coded picture of said video stream; (B) loading first motion compensation data for said group from a memory to a motion compensation process in a first bus transfer in response to all of said blocks in said group having both (i) a same first reference frame and (ii) a same first motion vector in at least one of a reference picture list 0 and a reference picture list 1; and (C) reconstructing said blocks from said first motion compensation data and said same first motion vector; and (D) encoding each of said blocks using a direct prediction mode for which no motion is created.

2. The method according to claim 1, further comprising the steps of: checking a respective second motion vector for each of said blocks; and loading second motion compensation data for said group from said memory to said motion compensation process in a second bus transfer in response to all of said blocks in said group having both a same second reference frame and a same second motion vector in one of said reference picture list 0 and said reference picture list 1.

3. The method according to claim 1, further comprising the step of: determining said respective first motion vectors from a plurality of co-located blocks decoded from said video stream.

4. The method according to claim 1, wherein step (A) comprises the sub-step of: checking said respective first motion vectors of four 8.times.8 blocks arranged as a 16.times.16 block.

5. The method according to claim 1, wherein step (A) comprises the sub-step of: checking said respective first motion vectors of two 8.times.8 blocks arranged as one of (i) a 16.times.8 block and (ii) an 8.times.16 block.

6. The method according to claim 1, wherein step (A) comprises the sub-step of: checking said respective first motion vectors of four 4.times.4 blocks arranged as an 8.times.8 block.

7. The method according to claim 1, further comprising the step of: weighting said first motion compensation data for said group according to a weighting factor.

8. The method according to claim 1, wherein steps (A), (B) and (C) form part of a decoder operation.

9. The method according to claim 1, wherein steps (A), (B) and (C) and (D) form part of an encoder operation.

10. A system comprising: a first memory configured to store motion compensation data related to a video stream; and a processor configured to (i) check a respective motion vector for each of a plurality of blocks in a group within an inter-coded picture of said video stream, (ii) load said motion compensation data for said group from said first memory to a motion compensation process in a bus transfer in response to all of said blocks in said group having both (a) a same reference frame and (b) a same motion vector in at least one of a reference picture list 0 and a reference picture list 1 and (iii) reconstruct said blocks from said motion compensation data and said same motion vector; wherein said processor comprises a motion compensation block configured to generate prediction data from both (i) said motion compensation data and (ii) said same motion vector.

11. The system according to claim 10, wherein said processor further comprises a motion vector reconstruction block configured to check said respective motion vectors of a plurality of small blocks to determine if said small blocks can be treated as one large block for motion compensation purposes.

12. The system according to claim 10, wherein said processor further comprises a second memory for storing said respective motion vectors in an order that would appear in a bitstream.

* * * * *